United States Patent [19]
Haring et al.

[11] Patent Number: 5,845,563
[45] Date of Patent: Dec. 8, 1998

[54] ROTISSERIE COOKER

[75] Inventors: Steven M. Haring, Hattiesburg, Miss.; George Schmidt, Douglaston, N.Y.; Glenn Doherty, Newbury; Dov Z. Glucksman, Wenham, both of Mass.

[73] Assignee: Sunbeam Products, Inc., Delray Beach, Fla.

[21] Appl. No.: 781,647

[22] Filed: Jan. 10, 1997

[51] Int. Cl.⁶ ..................................................... A47J 37/04
[52] U.S. Cl. ........................ 99/419; 99/421 R; 99/421 A; 99/421 V; 99/427; 99/446; 99/448
[58] Field of Search .................................. 99/419–421 V, 99/427, 400, 401, 444–446, 448, 339, 340

[56] References Cited

U.S. PATENT DOCUMENTS

| | | |
|---|---|---|
| D. 198,962 | 8/1964 | Wickenberg . |
| D. 262,709 | 1/1982 | Williams et al. . |
| D. 349,419 | 8/1994 | Koopman . |
| 1,887,219 | 11/1932 | Stranszky . |
| 2,179,646 | 11/1939 | Sparatalis . |
| 2,537,378 | 1/1951 | Staltare . |
| 2,581,570 | 1/1952 | Amanatides ........................... 99/421 V |
| 3,009,410 | 11/1961 | Murphy . |
| 3,026,400 | 3/1962 | Sciver . |
| 3,177,342 | 4/1965 | Wickenberg . |
| 3,221,638 | 12/1965 | Wickenberg ........................... 99/421 P |
| 3,448,679 | 6/1969 | Holka et al. ........................... 99/421 R |
| 3,566,075 | 2/1971 | Jepson et al. . |
| 3,583,307 | 6/1971 | Lee, Sr. .................................. 99/446 X |
| 3,817,164 | 6/1974 | Hintze ..................................... 99/421 V |
| 3,956,979 | 5/1976 | Coroneos ............................... 99/446 X |
| 4,270,444 | 6/1981 | Geissmann ............................ 99/421 P |
| 4,366,750 | 1/1983 | Brown et al. . |
| 4,372,199 | 2/1983 | Brown et al. ............................. 99/341 |
| 4,483,241 | 11/1984 | Vaughn . |
| 4,512,248 | 4/1985 | Volakakis ............................... 99/447 X |
| 4,590,848 | 5/1986 | Willingham ............................... 99/339 |
| 4,968,515 | 11/1990 | Burkett et al. . |
| 4,979,439 | 12/1990 | Ferron-Zepeda ...................... 99/421 R |
| 5,044,262 | 9/1991 | Burkett et al. .............................. 99/327 |
| 5,101,715 | 4/1992 | Liu . |
| 5,136,933 | 8/1992 | Derakhshan . |
| 5,205,207 | 4/1993 | McGuire . |
| 5,361,656 | 11/1994 | Koopman . |
| 5,367,950 | 11/1994 | Sarich . |
| 5,379,686 | 1/1995 | Silva . |
| 5,410,950 | 5/1995 | Rone . |
| 5,429,042 | 7/1995 | Koopman . |
| 5,445,063 | 8/1995 | Sherman . |
| 5,445,065 | 8/1995 | Lopata . |
| 5,451,744 | 9/1995 | Koopman et al. . |
| 5,471,915 | 12/1995 | Lopata . |
| 5,485,780 | 1/1996 | Koether et al. . |
| 5,533,440 | 7/1996 | Sher . |
| 5,536,518 | 7/1996 | Rummel . |
| 5,539,184 | 7/1996 | Su . |
| 5,575,196 | 11/1996 | Masel et al. ........................... 99/448 X |

OTHER PUBLICATIONS

Chef's Catalog, Reference No. 6147, Winter of 1996, p. 70.
Chef's Catalog, Reference No. 6147, Spring of 1997, p. 55.

*Primary Examiner*—Timothy F. Simone
*Attorney, Agent, or Firm*—Dennis M. Carleton; Paul D. Bangor, Jr.

[57] ABSTRACT

A rotisserie cooking appliance includes a base and attached wall in the form of a vertically bisected cylinder. The base contains a centrally-located spindle for the attachment thereon of a drip pan and a spit and basket assembly. The spit and basket assembly includes a circular wire basket for containing the food item to be cooked, with a spit attached to the center thereof, the spit having an integral handle at the top to facilitate the insertion and removal of the spit and basket assembly from the rotisserie. A electric heating element is provided which is located to the rear of the rotisserie, which emits more thermal radiation near the bottom of the cooking chamber than at the top thereof. A removable aluminum reflective element is configured behind the heating element to further direct thermal radiation towards the spit and basket assembly. A single door configured as a vertically bisected cylinder made of a transparent heat resistant plastic material is provided. When the door is in the closed position, a curved slot in the top thereof secures the spit and basket assembly in place.

47 Claims, 8 Drawing Sheets

ROTISSERIE COOKER

FIELD OF THE INVENTION

The present invention relates to a rotisserie cooking appliance, more specifically, the rotisserie of the present invention is provided with an improved heating element, a transparent door and an improved spit design for containing and handling the food product to be cooked.

BACKGROUND OF THE INVENTION

Devices which slowly rotate food above a heat source in order to promote even cooking are well known. Also well known in the art is the method of having the food rotate about a vertical axis in close proximity to a heat source, usually of the resistive electric variety, located along one side of the food to be cooked, or centrally along the axis of rotation. Such devices are disclosed, for example, in Wickenberg, U.S. Pat. No. 3,221,638, Hintze, U.S. Pat. No. 3,817,164, Geissman, U.S. Pat. No. 4,270,444, and Brown, et al., U.S. Pat. No. 4,366,750.

One limitation of such known devices is the inability to view the entire cooking chamber without opening the cover of the device. When the door to such device is opened for viewing of the food, the temperature in the cooking chamber decreases. Grease spatterings may escape the cooking chamber and the heating element will become exposed, causing a safety hazard. Brown, et al. has attempted to address these problems by providing a glass chimney which allows easy viewing of the food. A further problem associated with the device of Brown, et al., however, is that the glass chimney may become hot to the touch during the cooking cycle and is also susceptible to breakage during the cleaning process.

Another limitation of such known devices is their inability to cook evenly. In a typical rotisserie equipped with an electrical resistance heating element, most of the cooking is accomplished through the thermal radiation given off by the heating element. A problem arises because the thermal radiation also heats the air and causes it to rise to the top of the cooking chamber. Since the temperature at the top of the cooking chamber then becomes higher than the temperature at the bottom, the upper extremities of the food are cooked more quickly than those parts which are disposed toward the bottom of the cooking chamber.

Lastly, problems exist with respect to the rotisserie spits of such known devices. Typically, the food to be cooked must be mounted on a spit consisting of a single metal rod. This is often difficult to achieve with any degree of success because of the central hollow areas defined by such foods as whole chickens, turkeys and the like. Additionally, supplemental devices such as strings must be used to secure the legs and wings to keep them from flopping around as the food is rotated. Furthermore, difficulties exist in removing the cooked food from the cooking chamber and from the spit after removing the spit from the cooking chamber, since the food will be hot and usually, grease covered, especially in the case of horizontal rotisseries.

Accordingly, an advance in the art could be realized by providing a rotisserie cooker with a door which allows viewing of the entire cooking chamber when closed, is not hot to the touch, and is resistant to breakage.

Another improvement in the art could be realized by providing a unique heating element which compensates for the higher temperature at the top of the cooking chamber resulting from the effect of convection, resulting in even cooking throughout the entire cooking chamber.

An additional improvement could be realized by providing an improved spit which makes it easier to mount and dismount the food from the spit and to insert and remove the food from the rotisserie cooker.

SUMMARY OF THE INVENTION

It is desirable, therefore, to provide a new and improved rotisserie cooker that avoids the aforementioned limitations of the known rotisserie devices.

Specifically, it is desirable to provide an improved rotisserie cooker which comprises a substantially cylindrical body having a transparent door made of a heat-resistant plastic which forms approximately one half of the exterior of the cylinder to permit viewing of the entire cooking chamber without the need to open the door. Furthermore, to facilitate the insertion and removal of food to and from the cooking chamber, to prevent grease from spattering outside of the cooking chamber, and to prevent accidental contact with the heating element during cooking, the door is rotatable between open and closed positions.

It is also desirable to provide an improved rotisserie cooker having a spit and basket assembly comprising a basket, removably attached to the base of the spit to facilitate the mounting of food thereon, and a handle disposed on the opposite end of the spit to facilitate the manipulation of the spit and basket assembly into and out of the rotisserie cooker. The bottom of the basket defines feet to allow the spit and basket assembly to be freestanding when removed from the rotisserie cooker to facilitate the removal of the cooked food therefrom.

It is further desirable to provide a rotisserie cooker with an improved heating element which emits a greater amount of thermal radiation toward the bottom of the cooking chamber than at the top to compensate for the higher air temperature present at the top of the cooking chamber which results from convection therein. This is accomplished by providing a heating element that has a greater surface area disposed near the bottom of the cooking chamber than at the top thereof.

BRIEF DESCRIPTION OF THE DRAWINGS

In the accompanying drawings, the preferred embodiment of the present invention is illustrated in which.

DETAILED DESCRIPTION OF THE PREFERRED EMBODIMENTS

The present invention is described with respect to the preferred physical embodiments constructed in accordance herewith. It will be apparent to those of ordinary skill in the art that various modifications and improvements may be made without departing from the scope and spirit of the invention. Accordingly, the invention is not limited by the specific embodiments illustrated and described, but only by the scope of the appended claims, including all equivalents thereof.

Figure 1:
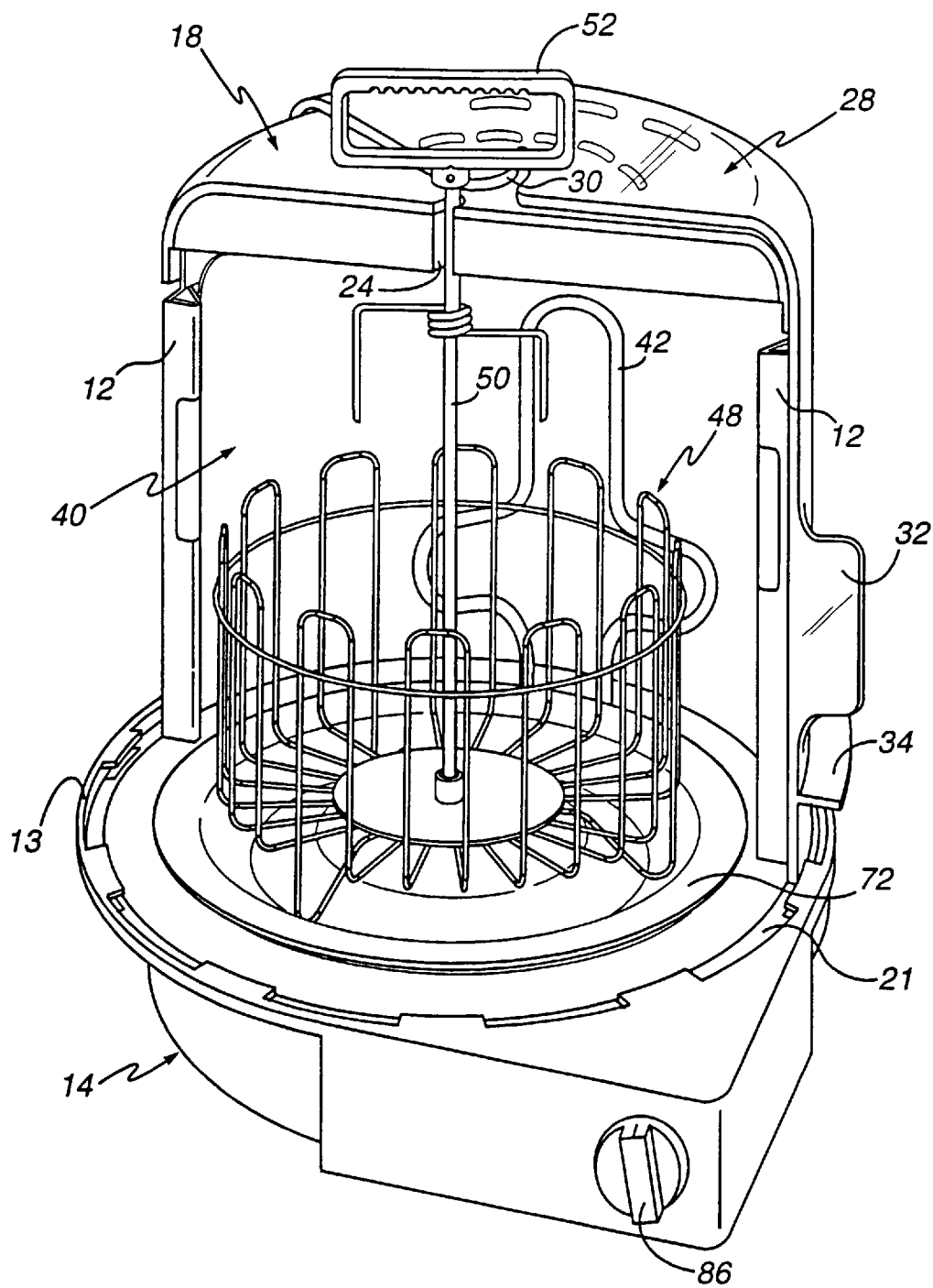
FIG. 1 is a front perspective view of the rotisserie cooker of the present invention showing the door in an open position and the spit and basket assembly installed in the rotisserie cooker.
Figure 2:
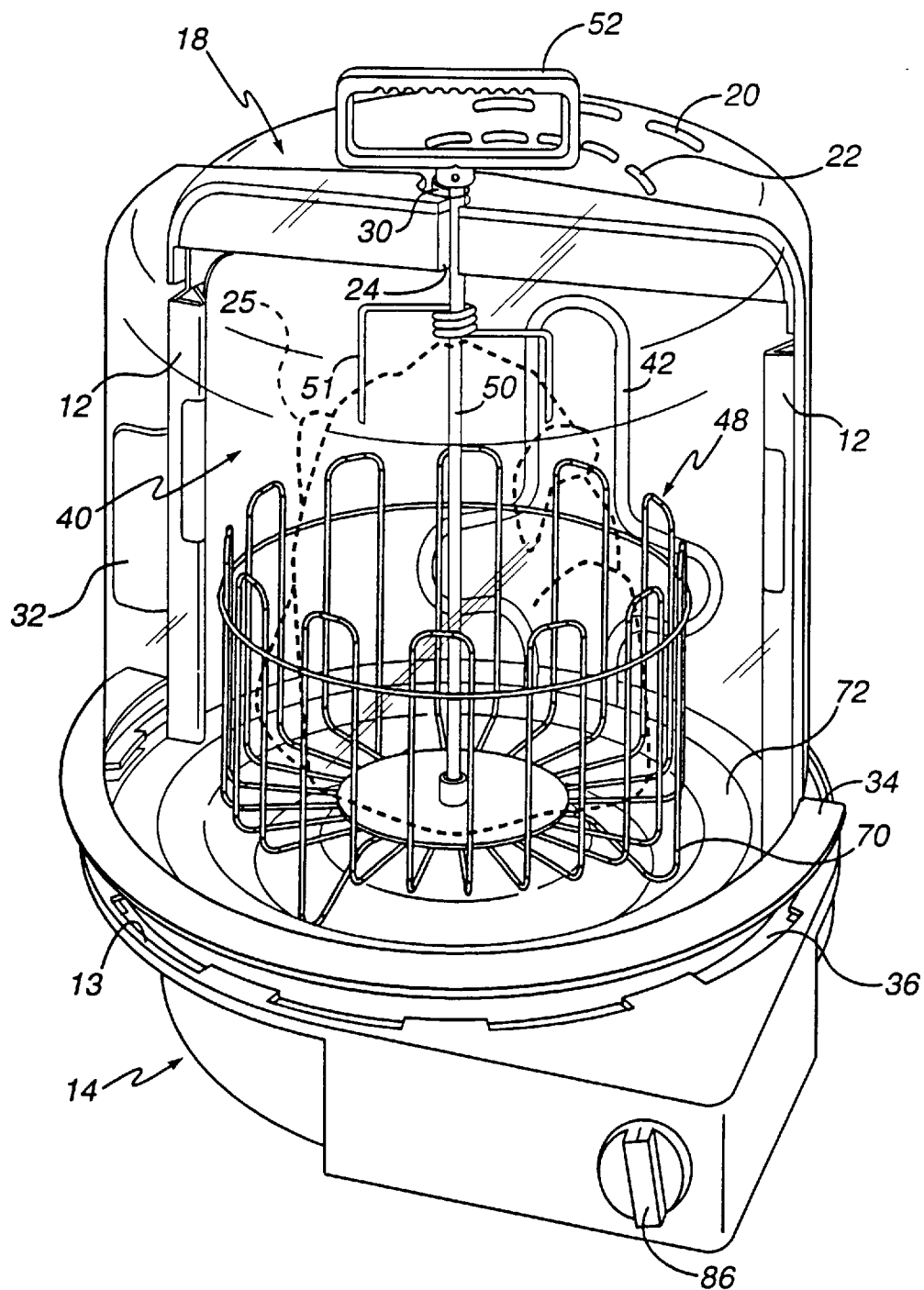
FIG. 2 is a front perspective view of the rotisserie cooker of the present invention with the door in the closed position.
Figure 5:
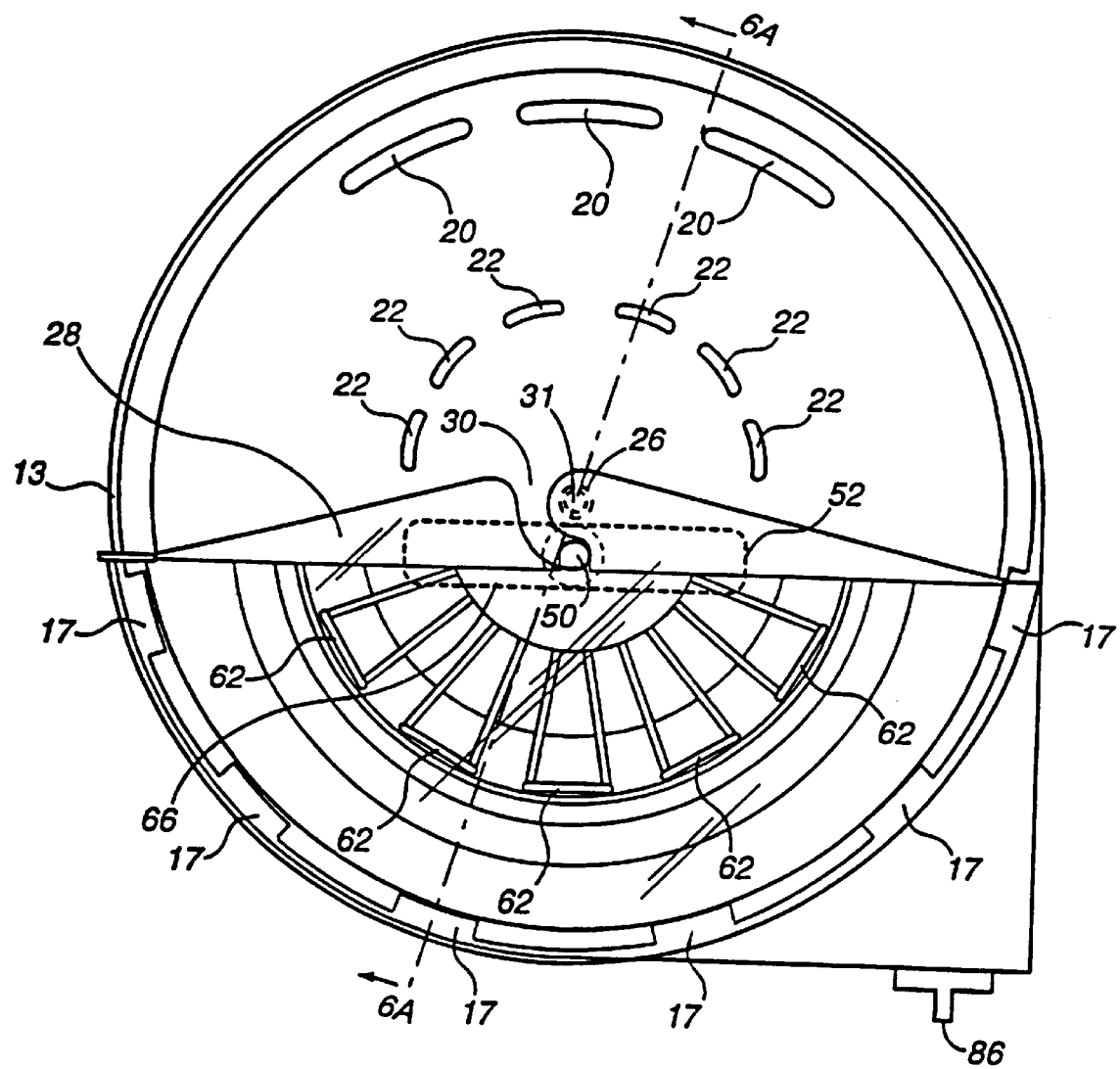
FIG. 5 is a top view of the rotisserie cooker of the present invention with the door in the closed position.
Figure 6A:
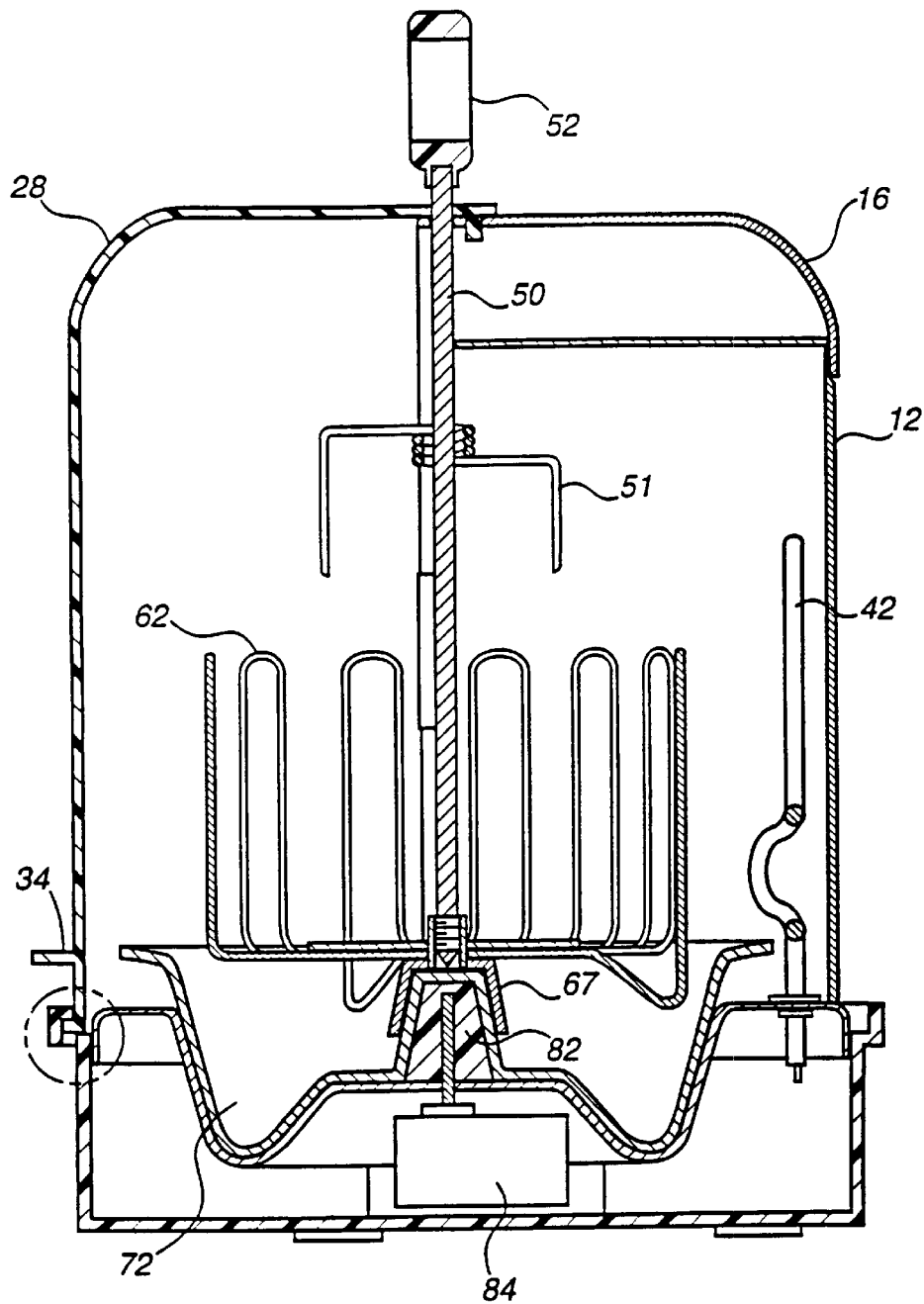
FIG. 6 is a cross-sectional view of the rotisserie cooker of the present invention along line 6—6 of FIG. 5.
Figure 6B:
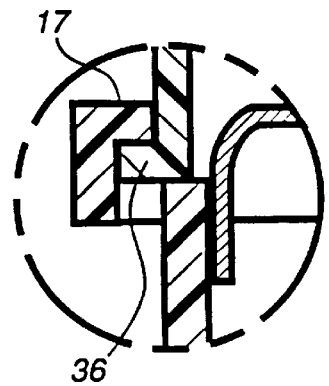

The rotisserie cooker 10 of the present invention, as best illustrated in FIGS. 1, 2, 3 and 6, comprises a base 14 and an open-faced housing comprising a curved, preferably semi-cylindrical wall 12 and a top 18 which define the rear of the cooking chamber 11. The top 18 defines a slot 24 and a plurality of ventilation apertures 20 and 22. A drip pan 72 and basket and spit assembly 48 are disposed within the cooking chamber 11 such that the spit 50 may be removably received in the slot 24 defined by the top 18. A heating element 42 and reflector panel 40 are disposed toward the rear of the cooking chamber 11. A sliding, transparent door 28, which defines an arcuate slot 30 in the top thereof, can rotatably slide between open and closed positions such that the spit 50 is received in slot 30 when the door 28 is closed thereby securing the spit 50 in slot 24 as shown in FIGS. 1, 2 and 5.

Figure 3:
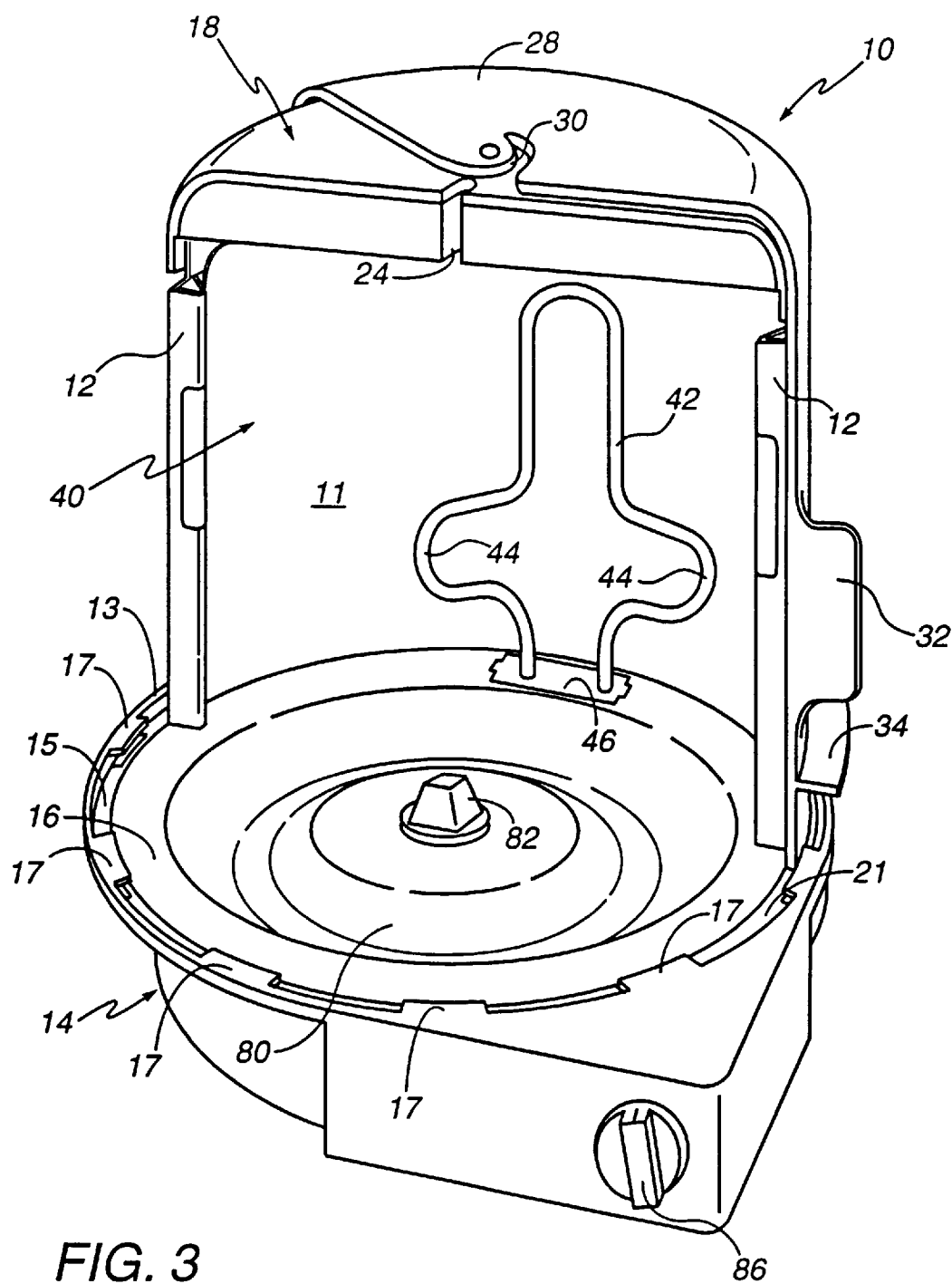
FIG. 3 is a front perspective view of the rotisserie cooker of the present invention with the door in the open position and the spit and basket assembly removed to show the details of the base top and heating element.

As best illustrated in FIGS. 1, 2 and 3, the base 14 of the rotisserie cooker 10 defines a depression or well 80 into which drip pan 72 is removably disposed. A frustum-shaped drive member 82, disposed in the center of the depression 80, is removably engageable with the hollow frustum-shaped member 73 defined by the bottom of drip pan 72. The frustum-shaped drive member 82 is rotationally driven by an electric motor 84 disposed within the base 14 during operation of the rotisserie cooker 10. The drip pan 72 is preferably disposed within the depression 80 with the hollow frustum-shaped member 73 disposed on and releasably engaged with the drive member 82 so that the drip pan 72 can be rotationally driven by the motor 84 and drive member 82.

The annular wall 13, ledge 15 and tabs 17, all of which are preferably integrally formed as part of the base 14, define a door guide or channel 21 which receives flange 36 on the bottom of door 28 when the user rotationally slides the door 28 from its open to its closed position. Of course it will be appreciated in view of the instant disclosure that as few as one tab 17 disposed at virtually any position along the front half of the generally circular base 14 would also prevent the door 28, with a flange 36 disposed along its entire outer surface, from being removed while in the closed position. In this same regard, flange 36 need not extend along the entire periphery of the door but need only extend a relatively short distance. As long as the flange 36 opposes the tab 17, which may comprise a single, semi-annular tab running along the front half of the annular wall 13, removal of the door 28 will be prevented when it is closed. Conversely, a single tab which runs along the front half of the annular wall 13 would also engage the semi-annular flange 36 or a single, shortened flange disposed on the door 28 and prevent the closed door 28 from being removed from the rotisserie cooker 10.

Time control 86 is positioned on the front of base 14 to allow the user to set the length of the cooking cycle. Heating element insulator 46 is positioned along the top 16 of base 14. Heating element 42 extends from the heating element insulator 46. Preferably, the heating element 42 is curved inwardly about its vertical or longitudinal axis.

As best illustrated in FIG. 3, heating element 42 is an electrically resistive element which emits thermal radiation when current flows therethrough. The thermal radiation cooks the food as it rotates in front of the heating element 42. The thermal radiation also warms the air within the cooking chamber 11. The heated air rises to the top of the cooking chamber 11 through the process of convection producing a vertical temperature gradient within the cooking chamber 11. The construction of the heating element 42 compensates for the vertical temperature gradient by providing proportionally increased thermal radiation near the bottom of the cooking chamber 11. The food 25 disposed within the bottom half of the cooking chamber 11, therefore, cooks as fast as the food disposed within the top half thereof. More specifically, the heating element 42 is preferably of a generally inverted "T" shape having ear portions 44 disposed in the bottom half of cooking chamber 11 to provide proportionally increased radiant thermal energy in the bottom half of the cooking chamber 11. The additional thermal radiation at the bottom of the cooking chamber 11 compensates for the higher air temperature at the top of the cooking chamber 11 and provides for even cooking of the food 25 over its entire surface. Preferably, more than half of the heating element 42 is disposed in the bottom half of the cooking chamber 11. Reflector panel 40, which is also curved preferably semi-cylindrical, is disposed between the heating element 42 and the rear wall 12 and reflects thermal radiation emitted from heating element 42 towards the food 25.

Figure 4:
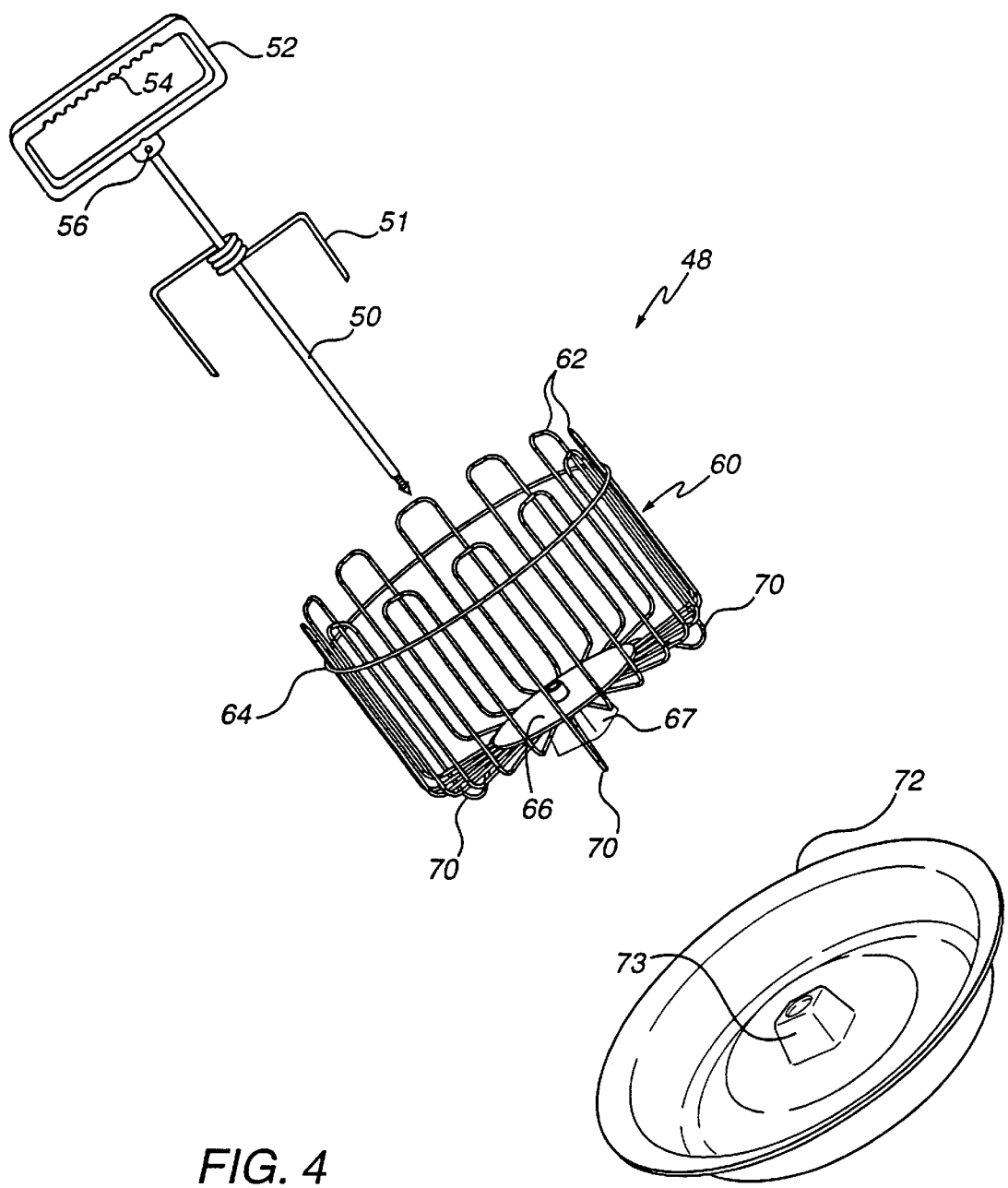
FIG. 4 is an exploded view of the spit and basket assembly of the present invention.

The spit and basket assembly 48, best shown in FIGS. 1, 2 and 4, preferably comprises a basket 60 having a plurality of looped-wire members 62, a band wire 64 disposed therearound, and a base plate 66 having an apertured collar or nut 68 disposed thereon. The interior surface of the collar 68 is preferably threaded so that the threaded end 58 of the spit 50 may be screwed into collar 68 to removably attach the spit 50 with the basket 60. A plurality of tines 51 are disposed around spit 50 such that they can slide up and down to engage the food 25 through which the spit 50 has been inserted. The handle 52 attached to the top of spit 50 and the grooves 54 therein assist the user in manipulating the spit and basket assembly 48. A plurality of feet 70 disposed around the bottom of the basket 60 allows the spit and basket assembly 48 to be free-standing when not disposed within the cooking chamber 11 thereby facilitating the removal of the cooked food from the spit and basket assembly 48. As shown in FIGS. 2 and 4, each of the feet 70 is preferably integrally formed as a part of one of the looped-wire members 62. The plurality of feet 70 also helps to stabilize the spit and basket assembly 48 in the drip pan 72. Hollow frustum cap 67, which is attached to the underside of the base plate 66 of the basket 60, releasably engages the frustum-shaped member 73 of drip pan 72 so that the spit and basket assembly 48 will rotate within the cooking chamber 11 when the drip pan 72 is rotationally driven by the frustum-shaped drive member 82.

A spit 50 having handle 52 releasably engageable with a separate hollow frustum-shaped cap 67 may also be used instead of the spit and basket assembly 48 in combination with other aspects of the present invention disclosed herein.

Figure 7:
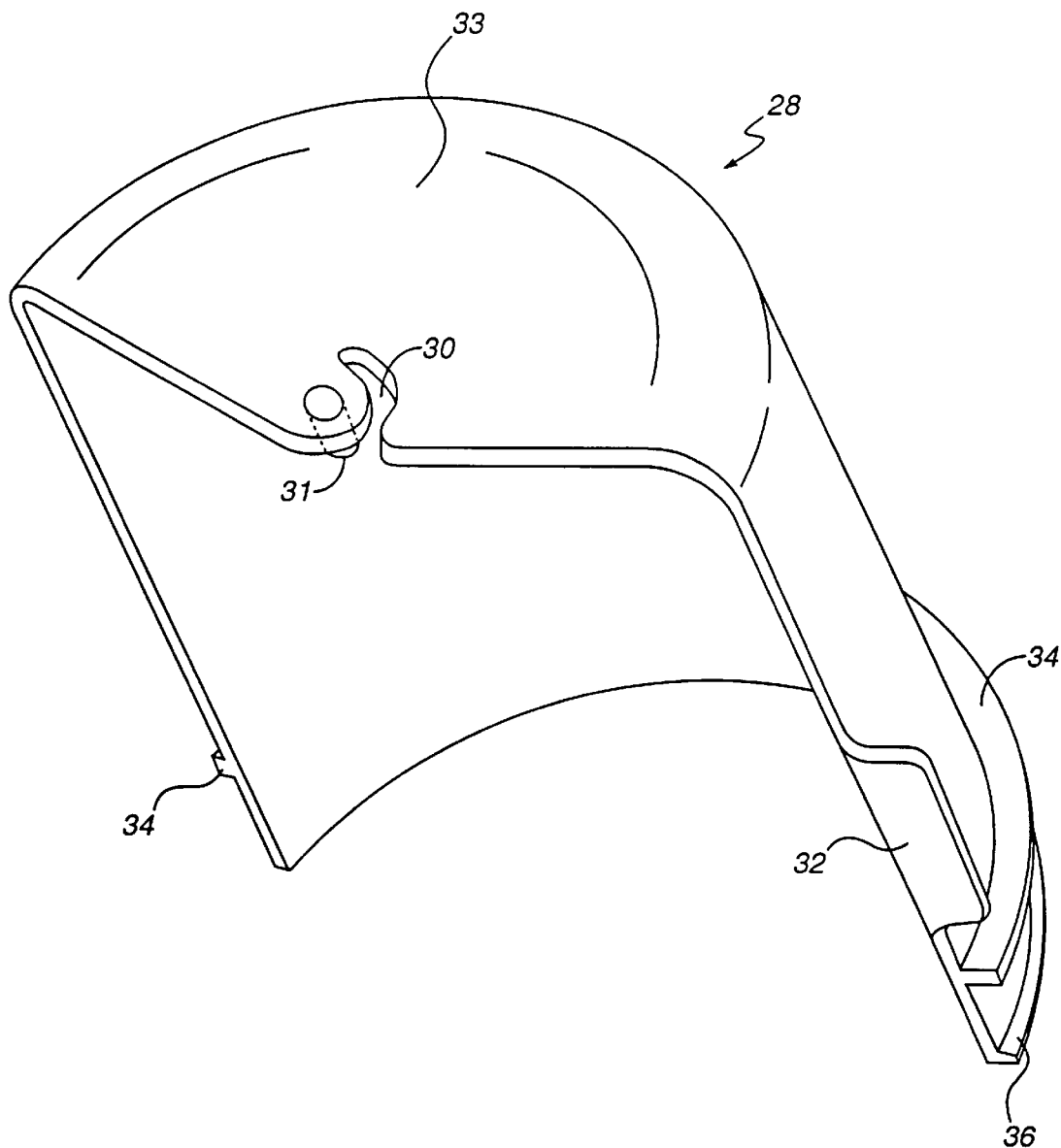
FIG. 7 is a perspective view of the sliding, transparent door of the rotisserie cooker of the present invention.

As best shown in FIGS. 1, 2 and 7, the door 28 comprises a curved, preferably semi-cylindrical wall 29 and a generally semi-circular top portion 33 which defines an arcuate slot 30. The wall 29 further defines the handle 32, shoulder 34 and flange 36, the latter two of which extend along at least a portion of the outer surface of the wall 29. The handle 32 is used to rotationally slide the door 28 between a closed position and open position and vice versa. The semi-annular shoulder 34 adds strength to the wall 29 and also can be used to assist in the rotation of the door 28 between its closed and open positions. A cylindrical projection 31 is defined by and extends downwardly from the interior of the top 33. The projection 31 is received in an aperture 26 (shown in dashed lines in FIG. 5) defined by the top 18 to provide a rotational axis around which door 28 is slidably rotated, and to secure the door 28 to the top 18 of wall 12.

Referring now to FIG. 2, when the door 28 is in the closed position, arcuate slot 30 receives and surrounds a portion of the spit 50 to releasably secure the same in slot 24. When the door 28 is in its open position, slot 30 no longer surrounds the spit 50 to allow removal of the spit and basket assembly 48 from the cooking chamber 11. With the door 28 open, the flange 36 is also no longer engaged within the door track 21 thereby allowing removal of the door 28 from the rotisserie cooker 10 to facilitate the cleaning of both. The door 28 is made of a transparent, heat-resistant, plastic material, preferably polysulfone, so that the entire cooking chamber 11 can be viewed during the cooking process without opening the door 28.

Figure 8:
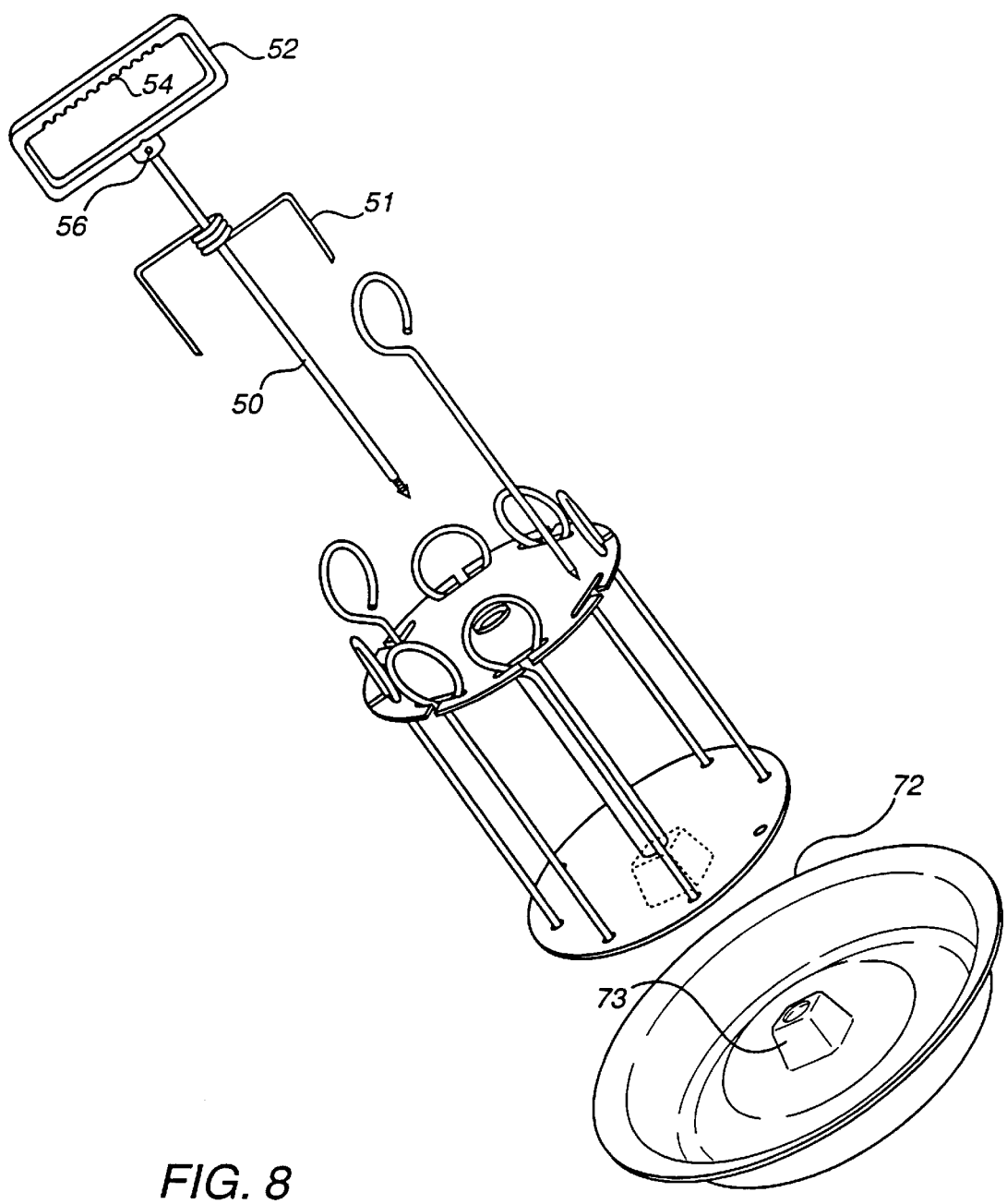
FIG. 8 is an exploded view of the spit and shish-kabob assembly for use in the rotisserie cooker of the present invention.

In another preferred embodiment of the present invention, a spit and shish-kabob assembly 90 may be utilized within the cooking chamber 11 and is removably and rotatably secured therein in the same manner as is the spit and basket assembly 48. As shown in FIG. 8, the spit and shish-kabob assembly 90 comprises the spit 51, having handle 54 and a shish-kabob member 98. Again, the spit 50 has a threaded end 58 which can be screwed into a threaded nut (not shown) in the bottom of the hollow connecting rod 94 to releasably secure the spit 50 with the shish-kabob member 98. The shish-kabob member 98 comprises a spool member 91 having a top surface 92 attached to the bottom surface 93 via the hollow connecting rod 94. Shish-kabob spits 96 having ring handles 97 are disposed in "T"-shaped slots 95 defined by the top surface 92 and apertures 89 in the bottom surface 93. The hollow frustum-shaped cap member 99 disposed on the bottom of the spool member 91 allows the spit and shish-kabob assembly 90 to be releasably engaged with either the frustum-shaped member 73 of the drip pan 72 or the frustum-shaped drive member 82 and thereby rotated when the motor 84 is activated.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

We claim:

1. A rotisserie cooker comprising:
   a base;
   a housing disposed on the base;
   a motor disposed within the base operatively connected to a drive member;
   a spit and basket assembly comprising a spit having a handle and a basket removably engageable with the spit, the spit and basket assembly being releasably engageable with the drive member;
   a heating element; and
   a door rotatable with respect to the housing between an open position and a closed position.

2. The rotisserie cooker of claim 1 wherein the door is transparent.

3. The rotisserie cooker of claim 1 wherein the spit and basket assembly is oriented substantially vertically when releasably engaged with the drive member, the housing and the door in its closed position define a generally cylindrical cooking chamber oriented substantially vertically and more than half of the heating element is disposed within a bottom half of the cooking chamber.

4. The rotisserie cooker of claim 3 wherein the heating element comprises at least one substantially vertical portion and at least one substantially horizontal portion, the substantially horizontal portion disposed in the bottom half of the cooking chamber.

5. The rotisserie cooker of claim 1 wherein the spit and basket assembly further comprises at least two tines.

6. The rotisserie cooker of claim 5 wherein the at least two tines are movable with respect to the spit.

7. The rotisserie cooker of claim 1 wherein the housing defines a first slot that receives a portion of the spit and the door defines a second slot and the portion of the spit is releasably secured within the first and second slots when the door is in the closed position.

8. The rotisserie cooker of claim 7 wherein the portion of the spit is located between the handle and the basket.

9. The rotisserie cooker of claim 8 wherein the first slot is substantially straight, the second slot is curved and each of the first and second slots has an open end and a closed end.

10. The rotisserie cooker of claim 1 wherein:
    at least one flange is disposed on an outer surface of the door, and
    the base defines at least one tab disposed above the flange when the door is in the closed position.

11. The rotisserie cooker of claim 1 wherein:
    a flange is disposed on an outer surface of the door, and
    the base is substantially circular and defines a semi-annular channel which receives the flange when the door is in the closed position.

12. The rotisserie cooker of claim 1 wherein:
    a semi-annular flange is disposed along the entire periphery of an outer surface of the door, and
    the base is substantially circular and defines a semi-annular channel which receives the flange when the door is in the closed position.

13. The rotisserie cooker of claim 12 wherein the channel is disposed along a front half of the base and is defined by a front half of an annular wall disposed on the base and a plurality of tabs extending from the annular wall.

14. The rotisserie cooker of claim 12 wherein the channel is disposed along a front half of the base and is defined by a front half of an annular wall disposed on the base and a semi-annular tab disposed along the front half of the annular wall.

15. The rotisserie cooker of claim 12 wherein the base further defines a well and a drip pan is rotatably disposed in the well between the drive member and the spit and basket assembly.

16. The rotisserie cooker of claim 15 wherein the drive member is generally frustum-shaped, the drip pan defines a hollow frustum-shaped member releasably engageable with the drive member and a hollow frustum-shaped cap is disposed on the bottom of the basket and is releasably engageable with the member of the drip pan.

17. The rotisserie cooker of claim 1 wherein the basket comprises a base plate, a plurality of looped-wire members attached to the base plate and a band disposed around the looped-wire members.

18. The rotisserie cooker of claim 17 wherein a plurality of legs are defined by the looped-wire members.

19. A rotisserie cooker comprising:

a base;

a housing disposed on the base;

a motor disposed within the base operatively connected to a drive member;

a spit having a handle and being releasably engageable with the drive member;

a heating element; and a door rotatable with respect to the housing between an open position and a closed position, wherein the housing defines a first slot that receives a portion of the spit and the door defines a second slot and the portion of the spit is releasably secured within the first and second slots when the door is in the closed position.

20. The rotisserie cooker of claim 19 wherein the first slot is substantially straight, the second slot is curved and each of the first and second slots has an open end and a closed end.

21. The rotisserie cooker of claim 19 wherein:

at least one flange is disposed on an outer surface of the door, and the base defines at least one tab disposed above the flange when the door is in the closed position.

22. The rotisserie cooker of claim 19 wherein:

a flange is disposed on an outer surface of the door, and the base is substantially circular and defines a semi-annular channel which receives the flange when the door is in the closed position.

23. The rotisserie cooker of claim 19 wherein:

a semi-annular flange is disposed along the entire periphery of an outer surface of the door, and the base is substantially circular and defines a semi-annular channel which receives the flange when the door is in the closed position.

24. The rotisserie cooker of claim 23 wherein the channel is disposed along a front half of the base and is defined by a front half of an annular wall disposed on the base and a plurality of tabs extending from the annular wall.

25. The rotisserie cooker of claim 23 wherein the channel is disposed along a front half of the base and is defined by a front half of an annular wall disposed on the base and a semi-annular tab disposed along the front half of the annular wall.

26. The rotisserie cooker of claim 23 wherein the base further defines a well and a drip pan is rotatably disposed in the well between the drive member and the spit.

27. The rotisserie cooker of claim 26 wherein the drive member is generally frustum-shaped, the drip pan defines a hollow frustum-shaped member releasably engageable with the drive member and a hollow frustum-shaped cap is releasably engageable with the spit and the member of the drip pan.

28. The rotisserie cooker of claim 19 wherein the door is transparent.

29. The rotisserie cooker of claim 19 wherein the spit is oriented substantially vertically when releasably engaged with the drive member, the housing and the door in its closed position define a generally cylindrical cooking chamber oriented substantially vertically and more than half of the heating element is disposed within a bottom half of the cooking chamber.

30. The rotisserie cooker of claim 29 wherein the heating element comprises at least one substantially vertical portion and at least one substantially horizontal portion, the substantially horizontal portion disposed in the bottom half of the cooking chamber.

31. The rotisserie cooker of claim 30 wherein the heating element is curved inwardly about its vertical axis.

32. The rotisserie cooker of claim 4 wherein the heating element is curved inwardly about its vertical axis.

33. A rotisserie cooker comprising:

a base;

a housing disposed on the base;

a motor disposed within the base operatively connected to a drive member;

a spit and shish-kabob assembly comprising a spit member having a handle and a spool member removably engageable with the spit member, the spool member removably containing a plurality of shish-kabob spits, the spit and shish-kabob assembly being releasably engageable with the drive member;

a heating element; and a door rotatable with respect to the housing between an open position and a closed position.

34. The rotisserie cooker of claim 33 wherein the door is transparent.

35. The rotisserie cooker of claim 33 wherein the housing defines a first slot that receives a portion of the spit member and the door defines a second slot and the portion of the spit member is releasably secured within the first and second slots when the door is in the closed position.

36. The rotisserie cooker of claim 35 wherein the portion of the spit member is located between the handle and the spool member and the first slot is substantially straight, the second slot is curved and each of the first and second slots has an open end and a closed end.

37. The rotisserie cooker of claim 33 wherein:

a flange is disposed on an outer surface of the door, and the base is substantially circular and defines a semi-annular channel which receives the flange when the door is in the closed position.

38. The rotisserie cooker of claim 37 wherein the channel is disposed along a front half of the base and is defined by a front half of an annular wall disposed on the base and a plurality of tabs extending from the annular wall.

39. The rotisserie cooker of claim 37 wherein the base further defines a well and a drip pan is rotatably disposed in the well between the drive member and the spit and shish-kabob assembly.

40. The rotisserie cooker of claim 39 wherein the drive member is generally frustum-shaped, the drip pan defines a hollow frustum-shaped member releasably engageable with the drive member and a hollow frustum-shaped cap is disposed on the bottom of the spool member and is releasably engageable with the member of the drip pan.

41. The rotisserie cooker of claim 33 wherein the heating element is curved inwardly about its vertical axis.

42. The vertical rotisserie of claim 1 wherein the door is made of polysulfone.

43. The vertical rotisserie of claim 19 wherein the door is made of polysulfone.

44. The vertical rotisserie of claim 33 wherein the door is made of polysulfone.

45. The vertical rotisserie of claim 1 wherein a semi-annular shoulder is disposed on the door.

46. The vertical rotisserie of claim 19 wherein a semi-annular shoulder is disposed on the door.

47. The vertical rotisserie of claim 33 wherein a semi-annular shoulder is disposed on the door.

* * * * *